Sept. 29, 1959  A. L. BOEGEHOLD ET AL  2,906,008
BRAZING OF TITANIUM MEMBERS
Filed May 27, 1953
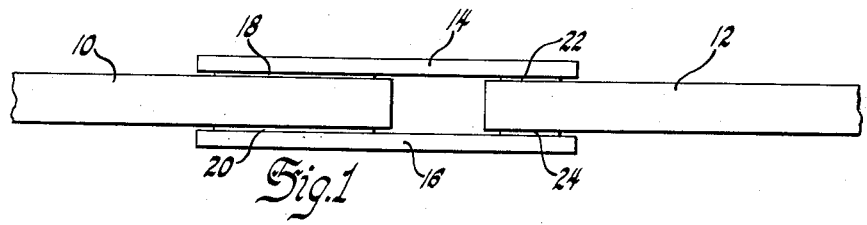
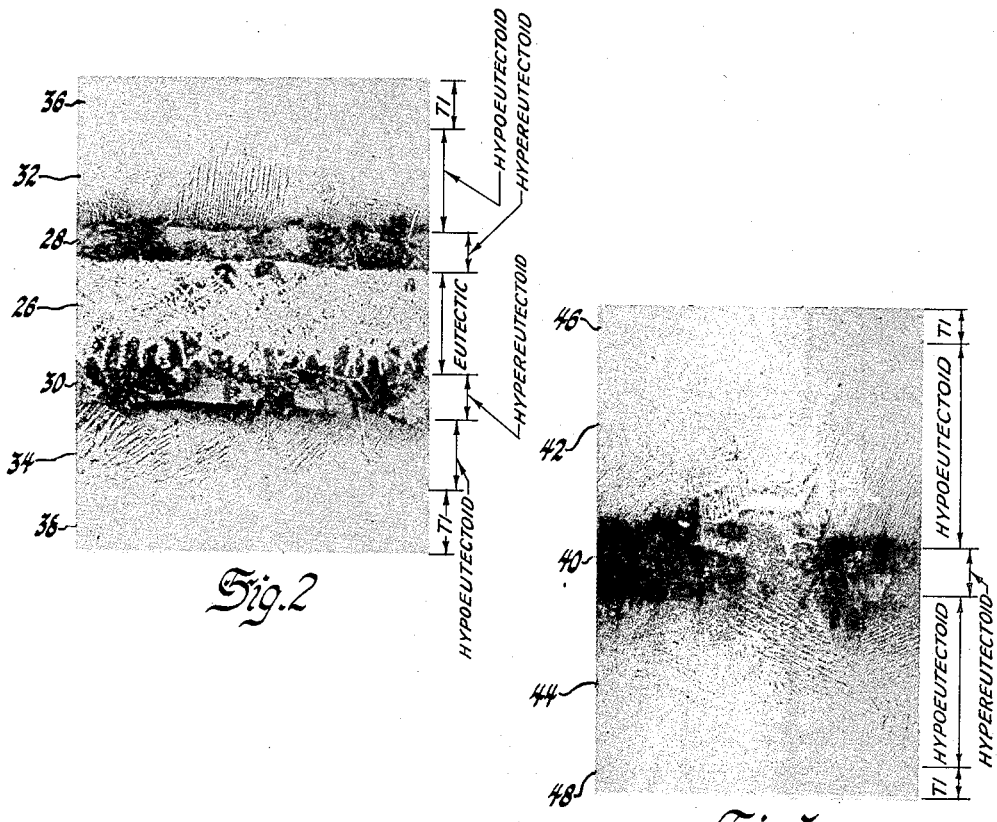
Inventors
Alfred L. Boegehold, &
Charles W. Vigor
By Willits, Helmig & Baillio
Attorneys

United States Patent Office 2,906,008
Patented Sept. 29, 1959

2,906,008

BRAZING OF TITANIUM MEMBERS

Alfred L. Boegehold and Charles W. Vigor, Detroit, Mich., assignors to General Motors Corporation, Detroit, Mich., a corporation of Delaware Application May 27, 1953, Serial No. 357,798

14 Claims. (Cl. 29—194)

This invention relates to brazed titanium base metal assemblies and more particularly to the joining of titanium members by a brazing process in which a layer of nickel or high nickel content alloy is interposed between the parts to be joined.

Heretofore, it has been exceedingly difficult to braze titanium or titanium base alloys due to the readily oxidizable nature of these materials. In addition to the above difficulty, all previous attempts at joining titanium parts by means of brazing have failed from a practical standpoint because of the formation of a brittle junction or interface between the titanium parts and the brazing material.

Accordingly, a principal object of the present invention is to provide a brazed titanium assembly in which titanium or titanium base alloy members are securely bonded together without the formation of a brittle interface layer. A further object of this invention is to provide a rapid and inexpensive process for brazing titanium members together whereby a secure joint having high shear strength is formed.

The above and other objects are attained in accordance with the present invention by a process for brazing titanium base metal parts by means of a thin layer of nickel or high nickel content alloy which is positioned between the titanium parts to be joined and thereafter heated to a temperature high enough to cause sufficient intermetallic solid-solid diffusion of nickel into titanium and vice versa to form a eutectic of approximately 30% or 31% nickel and 70% titanium which subsequently flows and fills the joint. On continued heating at or above the eutectic point, the nickel in the nickel-titanium eutectic diffuses into the adjacent titanium members until all the nickel is dissolved in solid beta phase titanium and the eutectic phase completely disappears, whereupon no molten material exists in the joint. The resultant joint is strong, reasonably ductile, and possesses excellent resistance to shear.

Other objects and advantages of this invention will more fully appear from the following description of a preferred embodiment of the invention shown in the accompanying drawing, in which:

Figure 1 is a fragmentary side view of a double shear brazing specimen having titanium parts which are joined together in accordance with the invention;

Figure 2 is a photomicrograph of a brazed and partially diffused titanium joint using a nickel shim as the source of nickel from which the molten nickel-titanium eutectic is formed; and Figure 3 is a photomicrograph of a brazed and completely diffused titanium joint using a nickel shim in accordance with the present invention.

Referring more particularly to the drawing, in Figure 1 is shown a pair of titanium members 10 and 12, the ends of which are to be joined by means of thinner titanium sheets 14 and 16. In this modification of the invention very thin sheets 18 and 20 of nickel or nickel base alloy are interposed between the titanium members 10 and 14 and 10 and 16, respectively. In a similar manner, smaller nickel shims 22 and 24 are positioned between titanium members 12 and 14 and 12 and 16, respectively.

Before assembling the various components of the titanium assembly in the foregoing manner, it is preferable to clean the titanium members by pickling in a hydrofluoric acid solution, an aqueous solution having a concentration of about 2% being preferred. After these components of the assembly are assembled in proper position, as shown in Figure 1, the assembly is heated to a temperature above 1760° F. and preferably above approximately 1800° F. It is not only important to have the titanium and nickel surfaces clean initially, but these surfaces must be maintained in clean condition at this elevated temperature. Thus the heating should occur under an inert atmosphere, such as a purified argon or helium atmosphere, in order to prevent oxidation of the readily oxidizable titanium members. Likewise, the assembly should be permitted to cool in this same atmosphere. Very pure argon is preferably used because it is heavier than air and hence may be conveniently employed to purge the furnace.

Although 1800° F. is a temperature considerably below the melting point of either nickel or titanium, it has been discovered that at this temperature there is sufficient intermetallic solid-solid diffusion of nickel into beta phase titanium to form a nickel-titanium alloy zone of sufficient nickel concentration to form a liquid eutectic phase of about 30% to 31% nickel. That the diffusion of nickel into titanium rather than titanium into nickel is the primary mechanism by which the liquid is formed is substantiated by our observation that the diffusion rate of nickel into titanium is perhaps 10 times greater than the reverse. While it is true that some nickel-rich titanium phases are formed during the diffusion, the amount of these phases is small and apparently they are rapidly dissolved in the eutectic liquid.

We have also found that, when the amount of nickel is small relative to the amount of titanium present in the adjacent parts, the beta phase titanium has such a large absorptive capacity for the nickel that upon continued heating the eutectic is depleted of nickel until no zone of eutectic composition remains. At or above the eutectic temperature of approximately 1760° F., the resultant material is high-melting beta phase titanium having nickel in solid solution. Upon cooling to room temperature, the beta phase titanium undergoes a eutectoid decomposition leaving alpha phase titanium and a $Ti_2Ni$ compound phase whose amount and distribution is governed by the nickel concentration in the beta phase.

In positioning the components of the assembly, it is preferable to have the titanium parts to be joined, such as sheet 14 and member 10, overlap the nickel sheet, such as shim 18, by approximately $\frac{1}{32}$ of an inch or more at each edge. Such an overlap prevents the molten eutectic formed by the nickel and titanium parts from flowing outside of the joint area. If the overlap is omitted and the eutectic is permitted to flow beyond the joint area, a certain amount of undercutting of the titanium components adjacent this joint may result due to the high solubility of the titanium in the eutectic.

A slight pressure is preferably applied to the assembled parts to maintain them in close contact, a pressure between one and three pounds per square inch being sufficient in almost all instances. Frequently only the weight of the uppermost members is necessary to provide satisfactory contact and a sound joint.

When the assembly is heated above 1760° F., and preferably above 1800° F., in an inert atmosphere, as hereinbefore described, the heating period preferably ranges between approximately one-half hour and three hours.

Heating for 1½ hours at about 1850° F. has been found to provide excellent results, although the temperature may vary from approximately 1760° F. to about 2400° F. However, 1900° F. normally should be considered to be the upper practical limit of the temperature employed. Within the aforementioned limits, of course, the use of higher temperatures permits a decrease in the heating period necessary, while employment of lower temperatures necessitates a longer heating period.

Referring now to the photomicrograph of Figure 2, there is shown a portion of a nickel-brazed titanium joint formed by the process described above. This photomicrograph, which has a magnification of approximately fifty diameters, is of a metallographic specimen which was etched with a solution consisting of about 2% hydrofluoric acid, 12% nitric acid, 45% glycerol and the balance water. In this joint, which was specifically formed and is shown to illustrate the apparent brazing mechanism involved in the present invention, the nickel is only partially diffused into the titanium. In order to obtain this partial diffusion, a short heating time and a relatively thick nickel shim were used to form the joint. Thus, a heating period of approximately 45 minutes at the relatively low temperature of 1850° F. was employed.

Use of a temperature at the lower end of the aforementioned temperature range is normally adequate if a very thin nickel sheet or shim is used or if, in the event a thicker nickel sheet is employed, the heating period is sufficiently long to permit complete diffusion of the eutectic even under these circumstances. However, the shim used in Figure 2 was approximately 0.004 inch thick; and because of the short brazing time and/or the relatively low temperature, an appreciable amount of eutectic remained in the joint upon cooling. The eutectic 26 is formed in the center of the joint at a location previously occupied by the nickel and is bounded on each side by layers 28 and 30 of nickel-titanium alloys which are hypereutectoid with respect to the nickel. Beyond the outer boundaries of the hypereutectoid layers are formed layers 32 and 34 which are hypoeutectoid with respect to the nickel. These hypoeutectoid layers diminish in nickel content away from the joint area and gradually merge into the adjacent titanium base metal parts 36 and 38.

When a longer heating time is employed and/or a thinner nickel shim is used in accordance with the invention, the desired type of joint shown in the photomicrograph of Figure 3 is formed. This photomicrograph also is a fifty diameter enlargement of junctions of nickel and titanium, the same etchant being used on this specimen as was employed on the sample shown in Figure 2. The specimen shown in Figure 3 was heated for approximately 1½ hours at 1860° F. The eutectic was initially formed in the joint; but subsequent heating diffused the nickel into the titanium base metal and shifted the composition of the eutectic to a lower nickel concentration until the eutectic phase completely disappeared, leaving the titanium-rich, high-melting point beta phase. This latter phase transformed by a eutectoid decomposition to the alpha phase plus $Ti_2Ni$ compound on cooling of the joint to room temperature. It is desirable to eliminate the eutectic from the joint because the eutectic is relatively brittle and would seriously weaken the joint if it were permitted to remain therein. The resultant joint, therefore, consists of a hypereutectoid area 40 bounded by hypoeutectoid zones 42 and 44 between the initial titanium base metal compositions 46 and 48.

As can be seen in Figure 3, the joint formed in accordance with the invention possesses no sharp lines of demarcation between the titanium, the hypereutectoid area and the hypoeutectoid zones. Hence, no brittle interface exists in this joint and it possesses exceptionally high strength. The formed hypereutectoid area preferably has a thickness between about 0.0025 inch and 0.02 inch, while the optimum thickness of each of the hypereutectoid areas is between 0.0075 inch and 0.04 inch. It will be appreciated, of course, that the extent of the labels differentiating the zones is only approximate and that portions of one zone actually extend into adjacent zones varying distances at different locations.

In order that the nickel layer between the adjacent parts may be completely absorbed by the latter without the formation of the brittle eutectic, the shims employed must be sufficiently thin to eliminate the possibility of retention of the eutectic in the joint. In general, the nickel shims should have a thickness between approximately 0.0002 inch and 0.003 inch, depending on the size of the parts to be joined, the desired strength of the joint, practicality of heating ranges and times, etc. While it has been found that, in some instances, these shims may be even thinner than 0.0002 inch, it rarely is desirable to use a shim thicker than 0.003 inch because of the difficulty of absorbing the additional nickel. To provide homogeneity and strength to the joint, it is normally preferable to employ shims having a thickness between 0.001 inch and 0.0015 inch. The shim thicknesses have been exaggerated in Figure 1, of course, in order to more clearly show the construction of this brazing specimen. Actually, nickel sheets having the aforementioned dimensions are in the form of a thin, flexible foil. If only thicker sheets are available, the desired shim thicknesses may be obtained by cold rolling.

Although the layer of nickel or nickel-containing alloy has been hereinbefore described as being used in the form of a thin sheet or shim, it alternatively could be applied to the titanium or titanium base alloy members to be brazed by means of a metal spray gun. Likewise, a nickel or nickel-containing powder may also be used as the brazing material. In general, the particle size of the metallic powder should be between 100 and 300 mesh although somewhat finer powders are usually also satisfactory.

More specifically, a titanium base alloy having a nickel content between 13% and 38% may be satisfactorily used in powder form, and in some instances nickel-titanium alloys having somewhat higher nickel contents may be employed. If a powdered alloy of this type has a nickel content which is very much less than the nickel content in the eutectic composition, however, capillary action of the brazing material may be detrimentally affected. Moreover, when nickel-titanium alloy compositions are used which differ very considerably from the eutectic composition, the cast alloy is insufficiently brittle to be easily pulverized into powder form. Hence it is desirable that such an alloy composition be within the aforementioned range. A powdered nickel-titanium alloy containing approximately 30% nickel and the balance substantially all titanium, which composition corresponds approximately to the eutectic mixture, has been found to provide a very sound joint.

It will be understood, of course, that pure nickel powder or other high nickel-content powders may be used instead of a nickel-titanium alloy powder or can be added to the latter to provide a brazing powder having a nickel content considerably above 38%. Thus it can be seen that when the brazing layer is applied in powder form the powder composition can be varied by the use of nickel or nickel base alloys to produce a brazing powder having a nickel content as high as 100%.

If a nickel-containing powder is to be used, it is preferably mixed with a volatile lacquer which vaporizes upon heating, this mixture being used in the form of a viscous liquid or paste. Such a paste may be applied as a fillet at the edge of overlapping titanium components and upon melting is drawn into the joint by capillary action. When a nickel-titanium powder approximating the eutectic composition is employed, the preliminary solid-solid diffusion is not needed to form the eutectic because the eutectic has been supplied as the powder. Normally the thickness of the paste or powder layer should approximately correspond to the thickness of the nickel base shims hereinbefore described. Likewise, the method and mechanism by which the eutectic disappears from the joint is the same as explained above.

In order to form a joint having high strength and reasonable ductility, it is normally desirable to employ nickel metal of high purity containing not in excess of approximately 0.02% carbon, particularly if used in shim form. However, as hereinbefore indicated, nickel-containing alloys, such as nickel-titanium alloys, may also be used if the nickel content is sufficiently high. Small amounts of other alloying elements, such as iron, aluminum, boron, carbon, chromium, silicon, manganese and silver, may also be present in the powdered alloy without detrimental results provided they do not adversely affect the melting point to too great an extent. For optimum results, however, it appears that these alloying elements should not be present in nickel-titanium alloy powders in amounts greater than approximately 15%.

Accordingly, it may be appreciated that nickel-containing bonding layers may be used if they contain a sufficient amount of nickel to provide the necessary diffusion and, as hereinbefore indicated, this nickel content may be as low as 13%. However, when a solid shim or sheet is employed in this brazing operation, a nickel-titanium alloy in which the titanium is the major constituent is normally too brittle to be rolled. Hence the practical shim compositions of this type are those which provide a sufficiently ductile sheet to permit it to be rolled to the appropriate thickness and used in sheet form. From the foregoing description it may be observed that, insofar as the broader aspects of our invention are concerned, the terms "nickel metal," "nickel base alloy," "nickel base metal," "high nickel content alloy" and "nickel-containing alloy," etc. are generally used interchangeably herein except where otherwise indicated. The scope of the invention, therefore, is not intended to be unduly limited by particular applications of such terminology and is intended to encompass all the examples disclosed in this description.

Although titanium base alloys in general may be employed in the present invention, excellent results are obtained with respect to shear strength when a commercially pure metal is used. An example of a commercially available titanium alloy is one composed of approximately 0.1% iron, 0.08% tungsten, 0.02% nitrogen, carbon not in excess of 0.04%, a trace of oxygen, and the balance substantially all titanium. Commercial titanium base alloys containing chromium, usually between 1.5% and 3%, may likewise be used. Thus an alloy composed of about 2.7% chromium, approximately 1.3% iron, 0.25% oxygen, 0.02% nitrogen, tungsten not in excess of 0.04%, 0.02% carbon, and the balance titanium has proved to be satisfactory. Commercially available alloys may also be obtained with manganese contents as high as 7% and aluminum contents up to 5%. It is likewise possible to achieve excellent results and to form a sound joint when joining titanium-nickel alloys. If such a nickel-containing titanium alloy is employed, however, it is preferable to maintain the nickel content below approximately 30% or 31%, and for optimum results the alloy preferably should not contain more than 7% nickel.

When subjected to shear tests in a tensile machine, joints formed by brazing in accordance with the present invention exhibited shear strength in excess of 40,000 pounds per square inch. In general, failure occurred partly in the joint area and partly in the titanium base metal itself. However, in many instances the failure occurred by tension only in the center joint component 10 or 12 outside the brazed area, while in other cases failure took place on one side of the joint by shear and on the other side by tensile failure of one of the overlapping components 14 and 16. Irrespective of the type of failure and the exact nature of the brazing mechanism hereinbefore described, however, these joints exhibited shear strengths considerably above those heretofore obtained with other methods of brazing titanium parts.

In view of the above discussion, it will be understood that the terms "titanium," "titanium base alloys" and "titanium base metals" are used interchangeably herein except as specifically differentiated in the specification description and that these terms are intended to cover pure titanium, commercially pure titanium and titanium base alloys applicable for use in the above-described process.

The heating of titanium above the alpha phase to the beta phase transformation temperature, which is approximately 1620° F., usually results in grain growth, the higher the temperature the more pronounced this grain growth. Although the resultant larger grain size does not materially affect the tensile strength of the joint, it does result in lowering the ductility of the titanium base metal.

However, the alloy layers produced in nickel-brazed joints in accordance with the invention are susceptible to heat treatment to produce greater strength and ductility, as well as increased hardness. For example, it has been found that, upon heating and quenching in water or other suitable media, the formed nickel-titanium alloy compositions from temperatures in the beta phase region, preferably between 1400° F. and 1800° F., a martensitic type reaction occurs in the hypoeutectoid area and the beta phase is retained in the hypereutectoid area. While neither of these phases shows an appreciable increase in hardness as quenched, tempering at a temperature between 400° F. and 1400° F. results in greater hardness and strength due to aging of the martensitic type phase and decomposition of the retained beta phase. Likewise, the ductility of the alloy zone is increased as a result of such heat treatment because the lamellar structure found in the "as-brazed" condition is thereby eliminated. In general, a tempering temperature of approximately 600° F. appears to provide optimum results.

While the present invention has been described by means of certain specific examples, it is to be understood that the scope of the invention is not to be limited thereby except as defined in the following claims.

We claim:

1. The method of forming a sound joint between titanium base metal members which comprises interposing a nickel base metal layer between a pair of titanium base metal members and in direct contact therewith, thereafter heating said members in an inert atmosphere at a temperature between 1760° F. and 2400° F. to form a molten nickel-titanium eutectic which flows to fill the joint area, and continuing to heat said members for a period of time sufficient to cause said eutectic to disappear because of the continued diffusion of nickel into said titanium base metal members.

2. A method of bonding titanium parts which comprises positioning a layer of a nickel base metal between a pair of titanium parts so as to directly contact said parts, and thereafter heating said parts and layer while in such contact under an inert atmosphere at a temperature between 1800° F. and 1900° F. for a period of time ranging from one-half hour to three hours, whereby the nickel base metal layer diffuses into the adjoining surfaces of said titanium parts to form an alloy therewith.

3. A process of brazing titanium base metal members together by means of a nickel base metal which comprises cleaning the titanium base metal members to be joined, interposing a thin nickel-containing layer between said members and in direct contact therewith, thereafter heating the parts so assembled for one-half hour to three hours in an inert gas atmosphere at a temperature above 1760° F., and subsequently cooling the formed brazed assembly in said atmosphere, thereby securely bonding said titanium base metal members together.

4. The process set forth in claim 3 in which the nickel-containing layer is applied to at least one of the titanium base metal members by spraying with a metal spray gun.

5. A method of joining titanium base alloy parts to form a composite assembly, said method comprising cleaning titanium base alloy parts to be joined by pickling in a dilute hydrofluoric acid solution, thereafter positioning a thin nickel shim between said parts, maintaining said titanium base alloy parts in close contact with said shim by applying a slight amount of positive pressure to the outer surfaces of said parts, heating said assembled parts and shim in an inert atmosphere for one-half hour to three hours at a temperature between 1800° F. and 1900° F., and subsequently cooling the formed brazed assembly in said atmosphere, thereby providing a joint between said titanium members having high shear strength.

6. The process of bonding titanium parts into a composite assembly by means of a brazing operation which comprises interposing a thin layer having a high nickel content between a pair of titanium parts to be joined so as to directly contact said parts, said layer having a thickness between 0.0002 and 0.003 inch, heating said parts and layer while in such contact to a temperature between 1800° F. and 1900° F. in an argon atmosphere for a period of time sufficient to cause inter-diffusion of the nickel and titanium base metal until a molten eutectic is formed, said molten eutectic flowing to fill the joint area, continuing to heat said parts and layer at said temperature and in said atmosphere until said eutectic disappears because of continued absorption of nickel, thereby leaving a titanium-rich high-melting point beta phase solid solution, and thereafter cooling said assembly to transform said beta phase solid solution to alpha phase titanium plus Ti$_2$Ni compound.

7. The process of brazing titanium members together by means of a nickel base alloy which comprises cleaning the titanium members to be joined by pickling in a dilute acid solution, positioning a nickel base alloy sheet between said parts and in direct contact with the adjacent surfaces thereof, maintaining a slight positive pressure on said parts to hold the nickel base alloy sheet securely in position therebetween, subsequently heating the assembled titanium members and nickel base alloy sheet in an argon gas atmosphere for one-half hour to three hours at a temperature between approximately 1800° F. and 1900° F., thereafter permitting the formed assembly to cool in said atmosphere, reheating said assembly for a short time at a temperature between 1400° F. and 1800° F., quenching the heated assembly, and finally tempering said formed assembly at a temperature between 400° F. and 1400° F. to increase the hardness and strength of the formed joint material.

8. A method of forming a joint between titanium base metal members which comprises positioning said members into abutment so as to provide a capillary opening between said members, applying a powdered titanium-nickel brazing alloy to the juncture of said members, and thereafter heating said members until said powdered brazing alloy melts and is drawn into said juncture by capillary attraction, whereupon absorption of nickel into the titanium base metal members from the molten brazing alloy transforms the molten phase to a solid phase to securely bond said members together.

9. The method set forth in claim 8 in which the powdered titanium-nickel brazing alloy contains between approximately 13% and 38% nickel.

10. The method set forth in claim 9 in which the powdered titanium-nickel brazing alloy has a particle size between 100 mesh and 300 mesh.

11. A brazed titanium assembly comprising a plurality of titanium parts joined together by means of a central titanium-nickel hypereutectoid area bounded on either side by a titanium-nickel hypoeutectoid area, the joint thus formed being free of nickel and titanium eutectic.

12. A brazed titanium assembly comprising a pair of titanium base metal members having adjacent surfaces into which a nickel base metal layer is diffused to form eutectic-free zones which are hypoeutectoid with respect to nickel and an interjacent zone which is hypereutectoid with respect to nickel, whereby said titanium base metal members are securely bonded together.

13. A method of bonding together titanium base metal members which comprises placing said members in juxtaposition with a nickel base metal layer between the surfaces to be joined, thereafter heating said members and layer in a non-oxidizing atmosphere at a temperature and for a period of time sufficient to cause inter-diffusion of the nickel and titanium base metal until a molten eutectic of nickel and titanium is formed and flows between said surfaces, continuing to heat said members and layer in said atmosphere until continued absorption of nickel by said titanium base metal eliminates said eutectic to provide a titanium-rich high melting point beta phase solid solution, and thereafter cooling said assembly to transform said beta phase solid solution to alpha phase titanium plus Ti$_2$Ni compound.

14. A method of forming a joint between titanium base metal members which comprises interposing a nickel base metal layer between titanium base metal members and thereafter heating said members and layer in a non-oxidizing atmosphere to a temperature above 1760° F. to cause nickel in said layer to form a molten nickel-titanium eutectic with said titanium base metal members and to subsequently diffuse the nickel out of said eutectic into said titanium base metal members to securely bond said members together.

References Cited in the file of this patent

UNITED STATES PATENTS

| 2,464,591 | Larsen | Mar. 15, 1949 |
| 2,633,633 | Bogart | Apr. 7, 1953 |
| 2,652,623 | Marden | Sept. 22, 1953 |

FOREIGN PATENTS

| 677,213 | Great Britain | Aug. 13, 1952 |

OTHER REFERENCES

"Our Next Major Metal—Titanium," Product Engineering, pp. 145 and 146, November 1949.

Titanium Metals Handbook, published October 1950, Titanium Metals Corp., 60 East 42nd St., New York 17, N. Y., pp. 77–79.

WADC Technical Report, 52–313 Part I, published November 1952, Wright Air Development Center, Batelle Memorial Institute.

"Brazing Titanium to Titanium and to Mild and Stainless Steels," 34 pp.